DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 24, 1970

871 O.G. 1023

T871,006
PROTECTIVE COATING FOR CELLULOSE ESTER PLASTICS

Robert C. Harrington, Jr., 2024 Canterbury Road, Kingsport, Tenn. 37660

Continuation of application Ser. No. 613,423, Feb. 2, 1967. This application July 22, 1969, Ser. No. 847,518
Int. Cl. C08f *45/30;* C09d *3/80*
U.S. Cl. 260—33.8
No Drawing. 10 Pages Specification

This invention relates to lacquer systems comprising an acrylic polymer and one or more ultraviolet screening agents in a methylchloroform solvent and the coating of cellulose plastic materials with such lacquer systems. Additionally, this invention relates to cellulose ester compositions that are coated with an acrylic lacquer which contains one or more ultraviolet screening agents.